ELECTRIC GENERATING SYSTEM CONTROL

Filed Oct. 17, 1962

INVENTOR.
JOHN W. KORDA
BY Williams, David, Hoffmann & Yount.
ATTORNEYS

United States Patent Office 3,470,455

Patented Sept. 30, 1969

3,470,455

ELECTRIC GENERATING SYSTEM CONTROL

John W. Korda, East Cleveland, Ohio, assignor to The Leece-Neville Company, Cleveland, Ohio, a corporation of Ohio Filed Oct. 17, 1962, Ser. No. 231,179

Int. Cl. H02p *9/30*

U.S. Cl. 322—28 22 Claims

The present invention relates to regulating systems and, more particularly, to regulators for electric generating systems.

In many cases it is desirable to use static circuit elements in the form of semiconductor devices which are switched on and off to control the energization of a circuit for performing a control function, such as regulating the output of a generating system. In the control systems which have used semiconductor switching devices of the avalanche type which are operated between conductive and non-conductive states to switch the control current off and on, the anode-to-cathode voltage of the device has been reduced below its extinguishing potential in order to switch the device off. This means that a varying voltage must be applied to the device to effect control. Moreover, in the type of circuit described, the device cannot be switched off while the anode-to-cathode potential is above the extinguishing voltage. Thus, once the device has been switched on, the device remains energized for the remainder of the cycle to the point where the anode-cathode voltage drops below the extinguishing potential.

An important object of the present invention is to provide a new and improved regulating system for an electric generating system wherein a circuit in which a control current is to be switched on and off by the operation of a semiconductor device of the avalanche type to control the output of the generating system is energized by a potential which does not have to fall below a predetermined level in order to extinguish the semiconductor device when the latter is to be switched off.

A further object of the present invention is to provide a new and improved control system particularly suitable for regulating electric generating systems wherein a semiconductor switching device of the avalanche type is switched between nonconductive and conductive states by switching a gate electrode between potentials which are positive and negative with respect to the cathode potential when the device is nonconducting and conducting, respectively, to effect the control operation as the condition to be controlled rises and falls to maximum and minimum levels.

Further objects and advantages of the present invention will be apparent from the following detailed description thereof made with reference to the accompanying drawings forming a part of the present specification and in which.

In accordance with the present invention, a regulating system, particularly a regulating system for electric generating systems, includes a semiconductor switching device of the avalanche type for controlling a current which is to be switched on and off to effect regulation in accordance with a varying unidirectional potential, the device having an anode, a cathode and a gate electrode. The switching device is of the type which is adapted to be switched on by a gate current flowing from the gate electrode to the cathode and which is adapted to be switched off by a gate current flowing from the anode to the gate electrode. Moreover, switching means responsive to the output condition to be controlled is provided to effect a switching of the gate electrode from a potential positive with respect to the cathode, which potential is adapted to establish a gate current to switch the semiconductor device on to a potential below the cathode potential of the semiconductor device when the device is conducting to switch the semiconductor device off, with the potential to which the gate electrode is switched to effect a switching on or off of the device being less than the potential relative to the cathode which is necessary to again switch the device when the device is respectively on and off. In the preferred and illustrated embodiment, the gate electrode is switched between its high and low potentials with respect to the negative terminal by a differential circuit element which is switched on when a unidirectional control voltage rises to a predetermined level and then off when the voltage falls to a predetermined minimum level.

Figure 1:
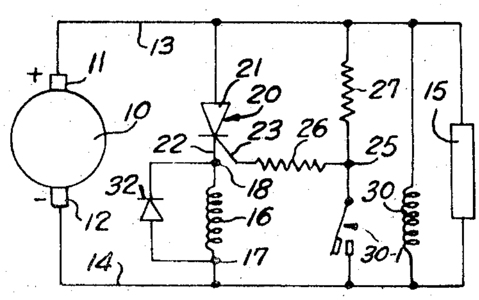
FIG. 1 is a circuit diagram of a regulating system for a D.C. generating machine which embodies the present invention.

Referring to FIG. 1, a direct current generator 10 has a positive armature terminal 11 and a negative armature terminal 12 which are connected to respectively energize conductors 13, 14 for supplying current to a load 15. The output of the generating machine 10 is controlled by a field coil 16 which is energized when the output of the machine falls to a predetermined minimum level and which is deenergized when the output of the machine rises to a predetermined maximum level. The field coil 16 has a negative terminal 17 connected to the conductor 14 and a positive terminal 18 connected to the positive conductor 13 through a semiconductor switching device 20 of the avalanche type. The semiconductor device 20 has an anode 21, a cathode 22 and a gate electrode 23. The anode of the device is connected to the conductor 13, while the cathode of the device is connected to the positive terminal 18 of the field coil 16.

The semiconductor switching device is of the type which may be switched on by establishing a gate current flowing from the gate electrode 23 to the cathode 22. Once the semiconductor device has been switched on, the "on" gate current loses control and the device will remain on, even though there is no gate current flowing, as long as the anode-to-cathode potential of the device does not drop below an extinguishing potential, which is usually about zero volts, and as long as an "off" gate current is not established in the device. The device may be switched off, however, by establishing an "off" gate current in the device from the anode to the gate electrode and this may be done by applying a potential to the gate electrode 23 which is negative relative to the cathode 22.

In the circuit shown in FIG. 1, the gate electrode 23 is connected to a junction 25 by a resistor 26 and to the positive conductor 13 by a resistor 27. When the generating machine 10 is started and as the machine comes up to voltage, the difference of potential between the conductors 13, 14 will establish a gate current which flows through the resistors 27, 26, the gate electrode 23, the cathode 22, and the field coil 16 to render the semiconductor device 20 conductive when the gate current is sufficiently large to trigger the device. It will be noted that this gate current helps the machine 10 come up to potential since it flows through the field winding 16. After the device 20 is switched on, the voltage across the conductors 13, 14 except for the small drop across the device 20, is applied to the field coil and the output of the generating machine 10 will continue to increase by reason of the energization of the field coil 16 until the maximum voltage level to be maintained by the regulating system is obtained. When this level is obtained, a regulating relay coil 30 is energized to close its normally open contacts 30–1. The closing of the normally open contacts 30–1 connects the junction 25 to the conductor 14 to lower the potential of the junction 25 to substantially that of the conductor 14. Since the voltage drop across the semiconductor switching device 20 is low when the device is conducting, the cathode potential 22 will be closed to the potential of the conductor 13 and will be sufficiently positive with respect to the junction 25 to cause an "off" gate current to flow from the anode 22 in the device to the gate electrode 23 to switch the device to its off condition.

The regulating relay 30 is of the differential type which will hold in until the output of the machine falls to the minimum level of regulation. At this level, the relay 30 will drop out and the contacts 30–1 will open. This will cause the potential of junction 25 to once again become positive with respect to the cathode 22 which is now substantially at the potential of conductor 14 except for the voltage drop across the field coil 16 due to the gate current. The gate current will cause the semiconductor device 20 to switch on again to energize the field coil 16 through the semiconductor device 20. This cycle of operation will be repeated to maintain the output of the machine between the maximum and minimum levels of regulation.

It will be noted that, when the device 20 is on, the voltage drop thereacross and, accordingly, across the resistors 26, 27, is small and only a very small gate current will flow.

In the embodiment illustrated in FIG. 1, the field coil 16 is paralleled by a diode 32 which short-circuits the inductive kick of the winding when the semiconductor device 20 is switched off.

Figure 2:
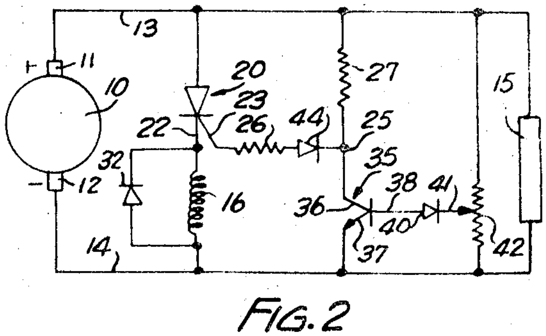
FIG. 2 is a circuit diagram of a regulating system for a D.C. generating machine embodying the present invention but different in construction from that shown in FIG. 1.

In the circuit of FIG. 2, the potential of the junction is switched between high and low levels by the operation of a transistor 35 rather than by the contacts 30–1 of the differential relay coil 30. The transistor 35 is of the NPN type and has a collector 36 connected to the junction 25, an emitter 37 connected to the conductor 14, and a base 38 connected by a Zener diode 40 to the sliding tap 41 of a potentiometer resistance 42 which is connected across the conductors 13, 14. The Zener diode 40 acts as a differential switching or relay device.

In addition to the described change in the circuit of FIG. 1, the circuit connecting the gate electrode 23 of the semiconductor device 20 to the junction 25 includes a Zener diode 44 which is connected between the junction 25 and the resistor 26. In operation, the Zener diode 44 is rendered conductive as the generating machine 10 comes up to the minimum voltage to be maintained by regulation and when the Zener diode 44 is conductive an "on" gate current flows from the conductor 13 through the resistors 27, 26, the gate electrode 23, the cathode 22, and the field coil 16 to switch the semiconductor device on as in the embodiment of FIG. 1. The transistor 35 is nonconductive while the machine is coming up to voltage and maintains the potential 25 at a positive voltage with respect to the conductor 14 until the output of the generating machine 10 rises to the maximum level of the regulation. At this time, the semiconductor device 20 is to be switched off. When this maximum voltage level is obtained, the potential drop between the sliding tap 41 and the conductor 14 causes the Zener diode 40 to break down and a base current flows in the transistor 35 to render the latter conductive and to lower the potential of the junction 25 to a potential slightly above that of the conductor 14. This causes an "off" gate current to flow from the anode 22 to the gate electrode 23 since the cathode potential 22, when the device 20 is conducting, is only slightly below the potential of the conductor 13 as in the first-described embodiment. The device is, therefore, switched off. It will be appreciated that, when the device 20 is switched off, the potential of the cathode 22 will be the same as the conductor 14, except for any gate current which flows, and the potential of the junction 25 relative to the conductor 14 must be less than the potential difference necessary between the junction 25 and the cathode 22 to switch on the semiconductor device 20. If this were not true, the semiconductor device 20 would immediately become conductive when the potential of cathode 22 dropped to the potential of the conductor 14 and would again switch on, and the off-on cycle would then be repeated as soon as the cathode potential was raised due to the switching on of the semiconductive device 20.

The transistor 35 remains conductive until the potential drop across the conductors 13, 14 falls to the potential necessary to extinguish the Zener diode 40 which is the minimum level of regulation. When the potential falls to this level, the semiconductor device is switched off and the potential of junction 25 raised to switch on the semiconductor device 20 to again energize the field coil 16.

Figure 3:
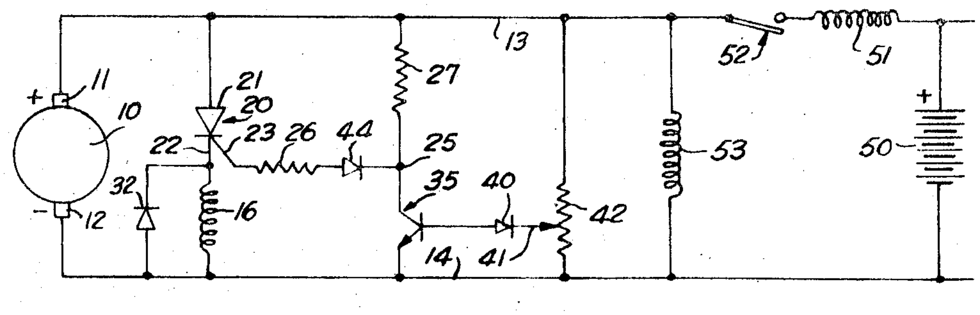
FIG. 3 is a direct current generating system embodying the present invention for supplying current to a load including a battery.

In FIG. 3, the circuit of FIG. 2 is shown as being utilized to supply a load including a battery 50, such as would be the case if the machine 10 were the generator of an automotive vehicle. The battery 50 has a positive terminal connected to the positive load conductor 13 through a current coil 51 and normally open contacts 52 of a conventional reverse current cut-off relay. The contacts 52 are controlled by a voltage-responsive coil 53 and by the current coil 51. The voltage-responsive coil 53 is connected across the conductors 13, 14 and, when the generating machine 10 comes up to voltage, closes the contacts 52 to connect the conductors 13, 14 across the battery 50. If the voltage across conductors 13, 14 drops to a predetermined level to cause a reverse current of a predetermined magnitude to flow from the battery through the current coil 51, the contacts 52 will open against the action of the voltage-responsive coil 53 to cut out the battery 50.

Figure 4:
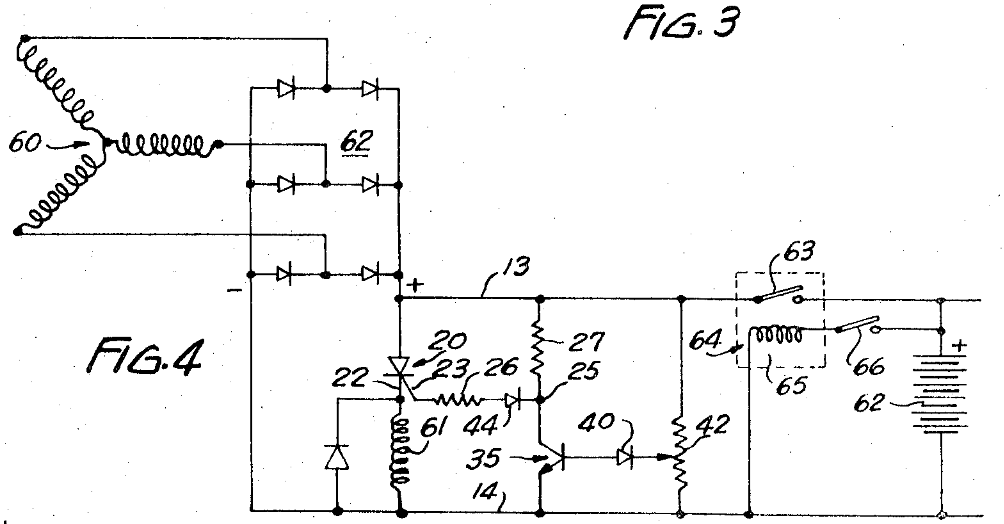
FIG. 4 is an electrical circuit diagram showing a regulating system embodying the present invention for regulating the output of an alternating-type generating machine and particularly suitable for use with automobile vehicles.

In FIG. 4, the regulating system is shown as controlling the output of an alternator having three-phase, wye-connected inductor windings 60 and a field winding 61 which corresponds to the field coil 16 of the first-described embodiment. The alternator inductor windings 60 are connected through a full-wave rectifier 62 to the conductors 13, 14. The circuit for energizing and de-energizing the field winding 61 is substantially the same as that shown in FIG. 2 for energizing the field coil 16 and the description of the operation of the regulating system will not be repeated. The parts of the regulating system for the winding 61 have been given the same reference characters as used in FIG. 2 to indicate the correspondence of the components and their mode of operation.

The conductors 13, 14 in the embodiment of FIG. 4 are connected to supply current to a battery load 62 with the conductor 13 being connected to the positive terminal of the battery through a normally open contact 63 of a load relay 64 having an actuating coil 65. The actuating coil 65 is connected across the battery 62 by a circuit including a manually controlled switch, which may be the ignition switch of a vehicle when the alternator 60 is used as the generator for an automotive vehicle. The closing of the switch 66 when the automobile is to be started effects the energization of the relay coil 65 to close the contacts 63 and connect the battery 62 across the conductors 13, 14. This means that the semiconductor switching device 20 will be immediately switched on by the gate current flowing through the resistors 27, 26 and the field coil 61. The switching on of the semiconductor device 20 will cause the alternator to come up to voltage at a rapid rate and, when it has come up to voltage, the system will operate to regulate the voltage in the same manner as described with respect to the system of FIG. 2.

Figure 5:
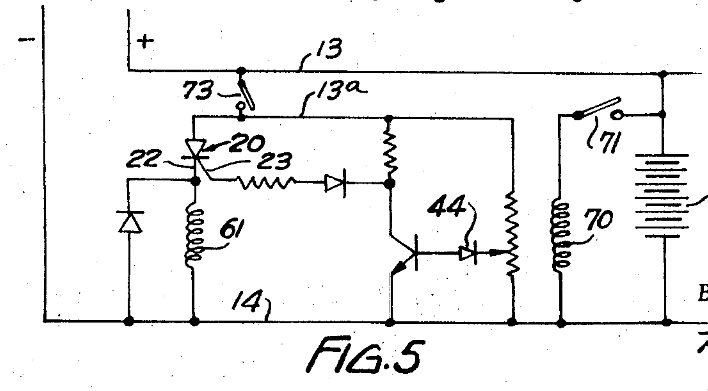
FIG. 5 is still another regulating circuit for a generating machine embodying the present invention and particularly suitable for use with automotive vehicles.

The system shown in FIG. 5 is a system which may be used in conjunction with an alternator as in FIG. 4 to control the output of an alternator for an automotive vehicle. In FIG. 5, the conductors 13, 14 are connected to the output of the full-wave rectifier 62, not shown in FIG. 5, but the field relay designated in FIG. 5 by the reference numeral 70 has normally open contacts which effect a connection or a disconnection of the conductor 13 to a conductor 13*a*. In operation, the field relay 70 is energized when the switch 71 connecting it across the battery is closed and the closing of the switch 71 and the energization of the relay 70 closes contacts 73 to connect the conductor 13 to the conductor 13*a*. The semiconductor device 20 and the field coil 61 are connected across the conductors 13*a*, 14, as well as the output sensing means comprising the potentiometer resistance 42 and the gate circuit for establishing the input potentials to the gate electrode 23. Consequently, the field coil 61 or the output sensing circuit and the circuit for controlling the switching device 20 cannot be energized until the switch 71 is closed to energize the relay coil 70 and close the contacts 73. The switch 71 may be the ignition switch when the system is in an automotive vehicle.

In describing the various embodiments of the present invention, the semiconductor device has been described as having an anode, a cathode, and a gate electrode. Basically, the device is a PNPN alloy junction device and such devices are sold by Tung-Sol Electric, Inc. under the trade name "Dynaquad;" by Transitron Electronic Corporation under the trade name "Transwitch;" and by Westinghouse under the trade name "TOT-SCR" for turn-off type S.C.R. The cathode and anode of the device may also be referred to as the collector and emitter and the gate electrode may be referred to as the base. It will be understood by those skilled in the art that the device, when off, is basically nonconductive due to its high resistance but, when switched on, an avalanche breakdown occurs which renders the device a low impedance current conductive device.

In the various circuits, the field coil has been energized from the same terminals or conductors as are used to energize the gate circuit. It will be appreciated that one source could be used to energize the field coil 16 through the semiconductor device 20, while a separate source might be used to provide the gate current for switching the device on and off. Moreover, these sources could be separate from the source of energizing the output sensing circuit including the differential relay coil 30 in the first-described embodiment and the resistor 42 and the Zener diode 40 in the embodiment shown in FIGS. 2–5.

When the same source of potential is used to energize both the field coil 16 through the semiconductor device 20 and to provide the gate current as in the described embodiments, it will be appreciated that the cathode potential for the gate circuit changes when the semiconductor device is rendered conductive. When the device 20 is switched on by raising the potential of junction 25 to a potential at least A volts above the cathode 22 which is at the potential of conductor 14 when the device 20 is nonconducting, the cathode 22 must not raise in voltage to a level above the junction 25 by more than B volts where B is the voltage between the junction 25 and the cathode 22 necessary to switch the device 20 off. Similarly, when the device 20 is conducting and the potential of junction 25 is lowered to switch the device off, the potential to which the junction 20 is lowered, if the device is to remain off, must not be more than A volts positive with respect to the conductor 14 if the device is to remain off. In the circuit of FIG. 1, the junction 25 remains above the potential of cathode 22 when the contacts 30–1 are open so that the device 20 cannot be switched off with the contacts 30–1 open. When the contacts 30–1 are closed, the junction 25 is at the potential of conductor 14, and, consequently, the device 20 cannot switch back on with the contacts 30–1 closed.

In the systems of FIGS. 2–5, there is a positive voltage drop across the transistor 35 when the latter is conductive and the junction 25 is at its lower potential. This drop, however, is less than that necessary to effect a breakdown of the Zener diode 14 and a switching on of the device 20 until the transistor 35 is switched off to increase the voltage drop thereacross. The resistance of the transistor 35 when it is off is sufficiently high that, for practical purposes, it functions in the manner of an open circuit, as in FIG. 1 when the contacts 30–1 are open.

It can now be seen that the present invention provides a regulating system, particularly a regulating system for use with electric generating systems wherein a semiconductor device of the avalanche type is switched between conductive and nonconductive states to control the current in a regulating circuit, with the conductor being switched on by gate current flowing in one direction from a gate electrode of the device to the cathode and being switched off by a current flowing in the opposite direction from the anode to the gate elecerode. The circuitry is such that it is not necessary to drop the anode-to-cathode voltage of the device below an extinguishing potential so that the device can control the flow of current from a direct current source and so that the device can be switched off at an intermediate point of the cycle when alternating current is used to energize the device.

While preferred embodiments have been shown and described in detail, it is hereby my intention to cover all modifications, constructions and arrangements which fall within the ability of those skilled in the art and within the scope and spirit of the present invention.

Having described my invention, I claim:

1. In an electric generating system, a generating machine having an output to be regulated between maximum and minimum levels, positive and negative terminals energized by the output of said machine, a circuit adapted to be switched between conductive and nonconductive states to control the output of said machine, said circuit including a semiconductor switching device having an anode and a cathode connected in series in said circuit, said device being of the avalanche type having a gate electrode and being adapted to be switched on and off by gate currents in the device between the gate electrode and the cathode when the gate electrode is positive with respect to the cathode and between the anode and gate when the gate is negative with respect to the cathode, a gate circuit for applying a potential across said gate electrode to potentials below and above the cathode of said device to establish gate currents in said device of opposite polarity to switch the device off and on, and output sensing means responsive to the output of said machine for switching said gate circuit as said output rises and falls to said maximum and minimum levels.

2. In an electric generating system as defined in claim 1 wherein said positive and negative terminals have a potential drop maintained thereacross during operation of the system sufficient to maintain said device conductive until switched off by a current in said gate circuit.

3. In an electric regulating system, a generating machine having an output to be regulated between maximum and minimum levels, positive and negative energizing terminals, a circuit adapted to be switched between conductive and nonconductive states to control the ouput of said machine, said circuit including a semiconductor switching device having an anode and a cathode connected in series in said circuit and a resistive circuit element connecting said anode to said negative terminal whereby said cathode is at a first potential positive with respect to said negative terminal when said circuit is conductive, said device being of the avalanche type and having a gate electrode and being adapted to be switched on by a gate current in the device between the gate electrode and the cathode when the gate electrode is positive with respect to said cathode and to be switched off by a gate current from said anode to said gate electrode when the latter is negative with respect to the cathode, circuit means connected across said terminals for applying potentials across said gate electrode and cathode and for switching the potential of said gate electrode to a potential above and below the cathode, and output sensing means responsive to the output of said machine for switching said circuit means as said output rises and falls to said maximum and minimum levels.

4. In an electric generating system as defined in claim 3 wherein said positive and negative terminals have a potential drop maintained thereacross during operation of the system sufficient to maintain said device conductive until switched off by a gate current in said device.

5. In an electric regulating system, a generating machine having an output to be regulated between maximum and minimum levels, positive and negative energizing terminals, a circuit adapted to be switched between conductive and nonconductive states to control the output of said machine, said circuit including a semiconductor switching device having an anode and a cathode connected into said circuit, said device being of the avalanche type having a gate electrode and being adapted to be switched on by a gate current in the device from the gate electrode and to the cathode when the gate electrode is positive with respect to the cathode and to be switched off by a gate current from said anode to said gate electrode when the latter is negative with respect to said cathode, a gate circuit connected to said terminals for applying potentials across said gate electrode and cathode for switching the potential of said gate electrode between a potential above and a potential below the cathode and including a junction and resistive circuit means for connecting said junction to one terminal and a transistor having its collector-emitter path connected between said junction and the other of said terminals and switched in response to said output of the machine between nonconductive and conductive states to switch said junction between potentials above and below the cathode of said device, and circuit means connecting said junction to said gate electrode.

6. In an electric generating system as defined in claim 5 wherein said positive and negative terminals have a potential drop maintained thereacross during operation of the system sufficient to maintain said device conductive until switched off by a current in said gate circuit.

7. A regulating system as defined in claim 6 wherein said circuit means connecting said junction to said gate electrode includes a voltage breakdown device poled to present its high resistance characteristic to current flowing from said junction to said electrode.

8. In an electric regulating system, a generating machine having a winding to be energized and de-energized to control the output of the machine, positive and negative energizing terminals for said winding, a semiconductor switching device of the avalanche type having an anode and a cathode connected in series circuit across said terminals with said winding, said cathode being connected to said negative terminal through said winding, said device including a gate electrode and adapted to be switched to a conductive state by a gate current flowing in said device from said gate electrode to said cathode when said gate electrode is positive with respect to said cathode and to a non-conductive state by a gate current flowing from said anode to said gate electrode when the latter is negative with respect to said cathode, resistive circuit means connecting said gate electrode to one of said terminals to apply a potential thereto of one polarity relative to said cathode when said device is in one of said states and switching means connected to a point in said resistive circuit means for connecting said point to the other of said terminals and adapted to be switched between conductive and nonconductive states to establish a potential at said gate electrode of an opposite polarity relative to said cathode to switch said device to its other state, and output sensing means responsive to the output of said machine for actuating said switching means as the output rises and falls to maximum and minimum levels.

9. In a regulating system, an electric generating machine having an output to be regulated between maximum and minimum levels and a winding adapted to be energized and deenergized to regulate the output of said machine, positive and negative energizing terminals for said winding, a semiconductor device of the avalanche type having an anode and a cathode and a gate electrode and adapted to be switched on and off by gate currents flowing in said device from and to said gate electrode when said gate electrode is respectively positive and negative with respect to said cathode, circuit means connecting said anode and cathode in series with said winding across said terminals and establishing said cathode at a potential above said negative terminal when said device is conducting, gate circuit means connecting said gate electrode to said positive terminal to establish a gate current in said device for switching said device on when a predetermined voltage level is applied across said terminals to render said device conductive and to establish at said cathode a potential above said negative terminal, and switching means connected to a point in said gate circuit means and to said negative terminal and operable to a particular condition to switch said point to a potential below the potential of said cathode when said device is conducting and which is below that potential relative to the negative terminal necessary to switch said device on when said device is nonconducting, and circuit means responsive to the output of said machine for actuating said switching means when said output rises and falls to the maximum and minimum levels to be controlled.

10. In a regulating system as defined in claim 9 wherein a Zener diode is connected between said gate electrode and said point and poled to present its high resistance to current flowing to said electrode and said switching means comprises a circuit element having resistance when in its said particular condition whereby said point is switched to a predetermined voltage positive with respect to said negative terminal when said device is to be switched off, said Zener diode having a breakdown voltage greater than said predetermined voltage but no greater than the potential drop between said point and said negative terminal when said point is at its high potential and said device is to be switched on.

11. In a regulating system as defined in claim 10 wherein said switching means comprises a transistor having a collector-emitter circuit connected to said point and a base circuit for controlling the conductivity of said transistor, said output sensing means being connected to said base circuit and comprising a resistance circuit across which a voltage varying with said output is applied and a Zener diode switched on and off when said output rises and falls to said maximum and minimum levels to switch the current in said base circuit on and off.

12. In an electric generating system, a generating machine having a winding energizable and de-energizable to control the output of said machine, positive and negative conductors energized from said machine, a semiconductor device of the avalanche type having an anode and a cathode and a gate electrode, circuit means connecting said anode and cathode in series with said winding across said conductors, said device being adapted to be switched on and off by gate currents flowing in said device from and to said electrode when said electrode is respectively positive and negative with respect to said cathode, a junction, second circuit means connecting said junction to said gate electrode, a resistance connecting said junction to said positive conductor, a circuit including normally open contacts connecting said junction to said negative conductors, a coil closing said contacts when a predetermined voltage is applied thereaross and dropping out said contacts at a lower voltage, and means connecting said coil across said conductors, a transistor having an emitter-collector path connecting said junction to said negative conductor, a base circuit for said transistor including a Zener diode for blocking the base current until the diode breaks down, a voltage dividing resistance connected across said conductors and applying a predetermined portion of the voltage across said Zener diode when the voltage across said conductors is at a predetermined level, said Zener diode extinguishing when the voltage across said conductors falls to a predetermined level.

13. In an electric generating system as defined in claim 12 wherein said second circuit means includes a voltage breakdown device pole to block current flowing to said gate electrode until said voltage breakdown device breaks down.

14. In an electric regulating system, a condition to be regulated between maximum and minimum levels, a circuit adapted to be energized when said condition falls to its minimum level and de-energized when said condition rises to its maximum level, positive and negative energizing terminals across which said circuit is connected, said circuit including a semiconductor switching device having an anode and a cathode connected into said circuit and a gate eletrode, said device being switched on by an "on" gate current flowing in said device when said electrode is A volts positive with respect to said negative terminal and switched off by an "off" gate current flowing in said device when said cathode is B volts positive with respect to said electrode, circuit means responsive to said condition for applying a potential to said gate electrode when the condition falls to its minimum level which is positive with respect to said negative terminal by at least A volts and is not greater than B volts negative with respect to said cathode when the device is conducting to switch said device on and to apply a potential to said gate electrode when said condition rises to its maximum level which is B volts negative with respect to the potential of said cathode when said device is on and not greater than A volts positive with respect to said negative terminal when said device is off.

15. A regulating system as defined in claim 14 wherein said circuit means includes a switching device of the avalanche type adapted to break down at said maximum potential to switch said gate electrode to its lower potential and to extinguish at said lower level to switch said gate potential to its higher lever.

16. In an electric regulating system, a condition to be regulated between maximum and minimum levels, a circuit adapted to be energized when said condition falls to its minimum level and de-energized when said condition rises to its maximum level, positive and negative energizing terminals across which said circuit is connected, said circuit including a semiconductor switching device having an anode and a cathode connected into said circuit and a gate electrode, said device being switched on by an "on" gate current flowing in said device when said electrode is A volts positive with respect to said negative terminal and switched off by an "off" gate current flowing in said device when said cathode is B volts positive with respect to said electrode, a junction to which said gate electrode is connected, circuit means responsive to a voltage varying with said condition and connected to said junction to provide first and second potentials between said junction and negative terminal to switch said device on and off and including a differential switching device having a first state in which it is nonconductive and actuated to a second state in response to the maximum level of said condition and returned to said state in response to a fall of said condition to said minimum level.

17. In an electric generating system, a generating machine having an output to be regulated between maximum and minimum levels, positive and negative terminals energized by the output of said machine, a circuit adapted to be switched between conductive and nonconductive states to control the output of said machine, said circuit including a semiconductor switching device having an anode and a cathode connected in series in said circuit, said device being of the avalanche type having a gate electrode and being adapted to be switched on and off by gate currents in the device between the gate electrode and the cathode when the gate electrode is positive with respect to the cathode and between the anode and gate when the gate is negative with respect to the cathode, a gate circuit for applying a potential across said gate electrode and cathode and for switching the potential of said gate electrode to potentials below and above the cathode of said device to establish gate currents in said device of opposite polarity to switch the device off and on, and output sensing means responsive to the output of said machine for switching said gate circuit as said output rises and falls to said maximum and minimum levels.

18. In an electric generating system having an output winding providing a voltage output to be regulated between maximum and minimum levels, positive and negative direct current terminals energized from said output winding, a controlled rectifier having an anode, cathode and gate electrode, said controlled rectifier being of a type which is triggered and rendered conductive when said gate electrode is driven to a potential which is more positive than the potential of its cathode and which is turned off when said gate electrode is driven to a potential negative with respect to its cathode, a field circuit connected across said positive and negative terminals for controlling the output voltage of said output winding in response to the current flow in the field circuit, said field circuit including the anode-cathode circuit of said controlled rectifier and a voltage developing circuit element between the cathode of said rectifier and said negative terminal, and a voltage dividing network connected across said terminals having an intermediate junction to which said gate electrode is connected, and means for establishing said junction at a potential positive with respect to said cathode when said rectifier is conducting and switching means responsive to the output of said generator for switching the junction between its said potential and a potential more negative than said cathode when said controlled rectifier is conductive to control the output of said generator in response to the magnitude of the output thereof as it rises and falls to said levels.

19. In an electric generating system as defined in claim 18, wherein said voltage developing element is a field winding.

20. In an electric generating system as defined in claim 18, wherein the gate electrode is directly coupled to said intermediate junction and the connection between said junction and gate electrode is a circuit capable of conducting a non-varying direct current whereby an "on" signal or an "off" signal is continuously applied to said gate electrode.

21. In an electric generating system as defined in claim 18, wherein said network comprises a resistance connecting said intermediate junction to said positive terminal and said switching means includes a transistor having its collector-emitter path connected between said junction and said negative terminal and a voltage responsive Zener diode is connected in the base circuit of said transistor to switch it on and off.

22. In an electric generating system, a generating machine having an output to be regulated between maximum and minimum levels, positive and negative direct current terminals energized by the output of said machine and having a potential thereacross continuously during the operation of the machine, a circuit connected across said terminals adapted to be switched between conductive and nonconductive states to control the output of said machine, said circuit including a semiconductor switching device having an anode and a cathode connected in series in said circuit, said device being of the avalanche type having a gate electrode and being adapted to be switched on and off by gate currents in the device between the gate electrode and the cathode when the gate electrode is positive with respect to the cathode and beween the anode and gate when the gate is negative with respect to the cathode, a gate circuit for applying a potential across said gate electrode and cathode and for switching the potential of said gate electrode to potentials below and above the cathode of said device to establish gate currents in said device of opposite polarity to switch the device off and on, and means for controlling the switching action of said gate circuit to regulate the output of the machine including sensing means for sensing the output of said machine.

References Cited

UNITED STATES PATENTS

| | | | |
|---|---|---|---|
| 2,980,0843 | 4/1961 | Conger et al. | 322—73 |
| 3,089,9998 | 5/1963 | Reuther | 323—22 |

OTHER REFERENCES

Transistor Circuit Manual (Allan Lytel), 1961, pp. 14 and 15.

ORIS L. RADER, Primary Examiner

HAROLD HUBEFELD, Assistant Examiner

U.S. Cl. X.R.

307—284; 322—73; 323—22

PO-1050
(5/69)

UNITED STATES PATENT OFFICE
CERTIFICATE OF CORRECTION

Patent No. 3,470,455 Dated September 30, 1969

Inventor(s) John W. Korda

It is certified that error appears in the above-identified patent and that said Letters Patent are hereby corrected as shown below:

In the claims:

Column 6, line 53, after "electrode" insert -- and cathode and for switching the potential of said gate electrode --

Column 9, line 12, after the first "said" insert -- conductors to said base circuit to effect a breakdown of said --

Column 9, at the end of line 51, change "lever" to -- level --

Column 9, line 73, after the first "said" insert -- first --

SIGNED AND
SEALED
MAY 26 1970

(SEAL)
Attest:

Edward M. Fletcher, Jr.
Attesting Officer

WILLIAM E. SCHUYLER, JR.
Commissioner of Patents